United States Patent Office 2,969,194
Patented Jan. 24, 1961

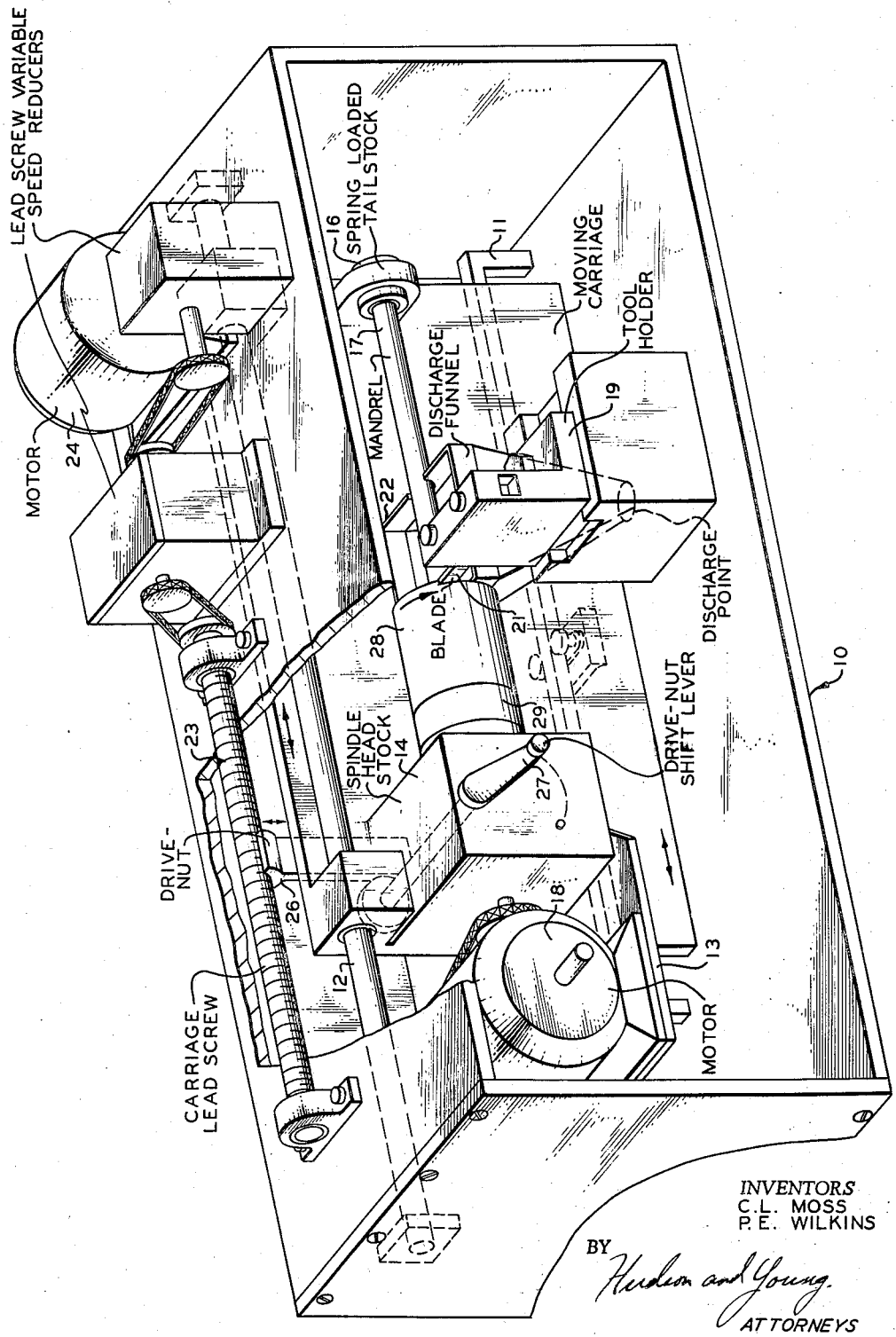

2,969,194
DRY FEEDER

Coy L. Moss, Albuquerque, N. Mex., and Paul E. Wilkins, Bartlesville, Okla., assignors to Phillips Petroleum Company, a corporation of Delaware Filed May 1, 1959, Ser. No. 810,487

3 Claims. (Cl. 241—279)

This invention relates to apparatus for the feeding of dry materials at carefully controlled rates.

In many operations, it is necessary to feed a dry material at carefully controlled rates to a process stream. There are many difficulties in this operation although a variety of feeders have been proposed. This is especially true wherein comparatively small amounts percentagewise are fed. Differences in bulk density of powdered materials cause volume measuring systems to introduce difficulties. There is also considerable difficulty in handling finely divided materials. Furthermore, differences in atmospheric conditions reduce the accuracy wherein a volume basis is used for dry material feeding.

The present invention was developed in working with the addition of anti-oxidants to polyethylene. Only a small amount of the anti-oxidant is added to the material in this operation but it is necessary that the amount added be accurately controlled.

The following objects and advantages are obtained by use of our invention.

An object of our invention is to provide new apparatus for accurately feeding dry material. A further object of our invention is to provide apparatus wherein the solid material feed can be easily varied. A further object of our invention is to provide a dry feeder which eliminates the measurement of materials in powder form.

Other objects and advantages of our invention will be apparent to one skilled in the art upon reading the accompanying disclosure which includes A drawing, partly in section, showing the apparatus of our invention, in perspective.

Broadly, the invention comprises apparatus which is based upon the lathe principle but which differs therefrom in certain important respects. In the use of the invention, the material to be fed is compressed into a solid form, preferably a cylinder, and is placed on a mandrel which is movable so as to provide a rotational and longitudinal movement of the solid cylinder. A stationary knife blade is provided and this moving solid cylinder of the material contacts the blade and a desired portion thereof is removed by the blade. The removed material is conveyed to the point of utilization.

Refinements in the apparatus include accurate drive means so that the supply of material can be maintained constant at any desired rate. Furthermore, a clutch arrangement is employed so that the feed can be interrupted at any desired moment.

It is believed that the invention can be fully understood from a study of the drawing and attention is now directed thereto. The apparatus comprises a casing 10 which functions as a support for the other elements of the apparatus. Mounted on the support 10 are guide members 11 and 12. These guide members support a carriage 13 which is longitudinally movable on these guide members. Supported on the carriage 13 is a spindle head stock 14 and a tail stock 16. A rotatable mandrel 17 is positioned between the head stock and tail stock. A motor 18 is also mounted on carriage 13, this motor being adapted to drive said mandrel through suitable gearing. Also mounted on support 10 is a fixed tool holder 19, blade 21 being carried thereby. Funnel 22 is mounted to receive material cut by the blade.

Mounted on the upper portion of support 10 is a carriage lead screw 23 which is driven by motor 24 through suitable gearing and speed reducers. A movable drive nut 26 is adapted to engage carriage lead screw 23 when drive nut shift lever 27 is placed in the operative position. When this lever is in the inoperative position, drive nut 26 is drawn out of contact with the lead screw.

In operation, the material to be fed is compressed into a cylinder with a center hole. In the drawing, this resulting cylinder 28 is shown and the cylinder is attached to a head 29. The end plate at the left of the apparatus is removable and, when removed, the carriage can be removed for insertion of a new cylinder of the material being fed. Moving spring loaded tailstock 16 to the right in the drawing permits removal of mandrel 17 and head 29 from headstock 14. The cylinder 28 can then be placed on the mandrel. The cylinder 28 is driven by head 29 by conventional means such as cement, a key, or serrations. When it is desired to feed material from cylinder 28, motor 18 is first started and the cylinder is allowed to reach a constant rotational speed. Then shift lever 27 is moved to the operative position so that drive nut 26 engages lead screw 23. This causes the moving carriage, including the rotating mandrel 17, to move longitudinally so that the material 28 contacts knife blade 21. Blade 21 is adjustable but generally is positioned to extend to the surface of mandrel 17. Material cut from the cylinder drops into funnel 22 and is discharged to the point of utilization.

A machine of the type described was utilized to feed Santonox, a polyethylene anti-oxidant, to polyethylene. Santonox is 4,4'-thiobis(6-tertiary-butyl-m-cresol). The cylinders were made by compressing the Santonox by applying a pressure of 16,000 p.s.i. One of these cylinders was turned in the apparatus of our invention at 8 r.p.m. while moving the cylinder longitudinally at a feed rate of 0.005 inch per minute. Over an 8-hour period a feed rate of 0.24 gram per minute was obtained.

Subsequently, a larger scale run was made and a feed rate of 0.66 gram per minute was obtained with, over an 8-hour period, an error of ±0.06 weight percent at this rate. This accuracy is well within that required in plant operation wherein the amount of anti-oxidant used is approximately 0.05 percent based upon the polyethylene.

As many possible embodiments can be made of this invention without departing from the scope thereof, it is to be understood that all matter herein set forth is to be interpreted as illustrative and not as unduly limiting the invention.

We claim:

1. Apparatus for feeding a solid material at a predetermined rate to a point of utilization comprising, a support; a first stationary guide member mounted on said support; a second stationary guide member mounted on said support; a carriage supported by and movable on said first and second guide members; a spindle head stock mounted on said carriage; a tail stock mounted on said carriage; a rotatable mandrel positioned between said head stock and said tail stock; a motor mounted on said carriage adapted to drive said mandrel; a fixed tool holder mounted on said support; a cutting blade carried by said tool holder, said blade being positioned adjacent said rotatable mandrel; a discharge funnel mounted on said support, said funnel being positioned to receive material cut by said blade; a carriage lead screw mounted on said support; a motor adapted to drive said lead screw; a drive nut on said carriage engageable with said carriage lead screw; and a shift lever on said spindle head stock, said shift lever moving said drive nut into and out of engagement with said lead screw.

2. Apparatus for feeding a solid material at a predetermined rate to a point of utilization comprising, a support; guide means mounted on said support; a carriage supported by and movable on said guide means; a spindle headstock mounted on said carriage; a tailstock mounted on said carriage; a rotatable mandrel positioned between said headstock and said tailstock; means to drive said mandrel; fixed cutting means positioned adjacent said rotatable mandrel; and means to move said carriage longitudinally of said support.

3. Apparatus for feeding a solid material at a predetermined rate to a point of utilization comprising, a support; a first stationary guide member mounted on said support; a second stationary guide mounted on said support; a carriage supported by and movable on said first and second guide members; a spindle headstock mounted on said carriage; a tailstock mounted on said carriage; a rotatable mandrel positioned between said headstock and said tailstock; a motor mounted on said carriage adapted to drive said mandrel; a fixed tool holder mounted on said support; a cutting blade carried by said tool holder, said blade being positioned adjacent said rotatable mandrel; a carriage lead screw mounted on said support; a motor adapted to drive said lead screw; a drive nut on said carriage engageable with said carriage lead screw; and a shift lever on said spindle headstock, said shift lever moving said drive nut into and out of engagement with said lead screw.

References Cited in the file of this patent

UNITED STATES PATENTS

| | | |
|---|---|---|
| Re. 8,258 | Meech | May 28, 1878 |
| 655,868 | Holtgen | Aug. 14, 1900 |
| 684,043 | Buhne | Oct. 8, 1901 |
| 824,768 | Welch | July 3, 1906 |
| 2,431,294 | Duluage | Nov. 18, 1947 |
| 2,446,345 | Snow et al. | Aug. 3, 1948 |
| 2,462,090 | Galvin | Feb. 22, 1949 |
| 2,552,676 | Hill | May 15, 1951 |
| 2,627,377 | Fletcher | Feb. 3, 1953 |